United States Patent [19]

Liu

[11] Patent Number: 5,111,909

[45] Date of Patent: May 12, 1992

[54] STEP FOR ATTACHMENT TO A WHEEL

[76] Inventor: Steve Liu, No 304, Chung Cheng South Road, Yung Kang Hsiang, Tainan Hsien, Taiwan

[21] Appl. No.: 769,240

[22] Filed: Oct. 1, 1991

[51] Int. Cl.⁵ ............................................. B60R 3/00
[52] U.S. Cl. ..................................... 182/150; 182/90; 280/165
[58] Field of Search ................. 182/150, 90, 156, 152; 280/165

[56] References Cited

U.S. PATENT DOCUMENTS

| | | | |
|---|---|---|---|
| 2,848,150 | 8/1958 | Tans | 182/150 |
| 4,495,883 | 1/1985 | Hoy | 182/150 |
| 4,782,916 | 11/1988 | Hays | 182/150 |
| 4,800,987 | 1/1989 | Liles | 182/150 |
| 4,907,674 | 3/1990 | Miller | 182/150 |
| 4,911,264 | 3/1990 | McCafferty | 182/150 |
| 4,947,961 | 8/1990 | Dudley | 182/150 |

Primary Examiner—Reinaldo P. Machado
Attorney, Agent, or Firm—Bacon & Thomas

[57] ABSTRACT

A portable step for supporting a person while working in the engine compartment of a vehicle, such as a truck. The portable step comprises a generally planar member and two legs on the generally planar member having a wheel attachment assembly at their upper ends for hooking onto either the front wheel or rear wheel of the vehicle thereby to suspend the planar member in a position wherein it is generally horizontal and at an elevation above the ground where a person standing on the planar member has convenient access to the engine compartment of the vehicle. Also disclosed is such a portable step wherein the wheel attachment assembly and the planar member are collapsible to minimize the size of the portable step for storage.

3 Claims, 4 Drawing Sheets

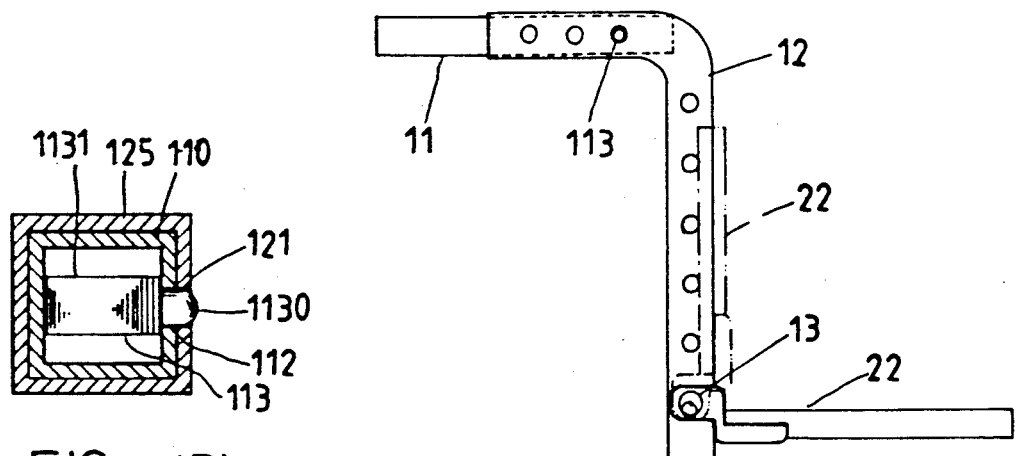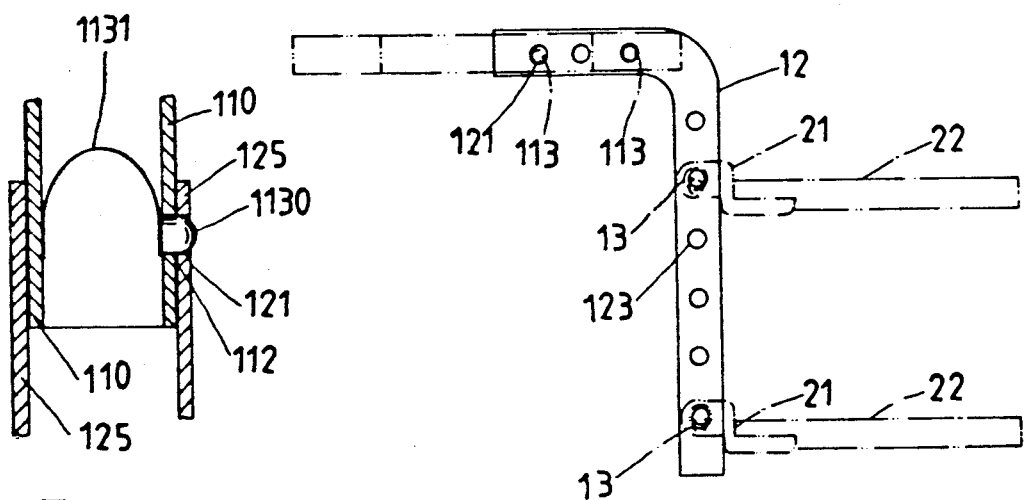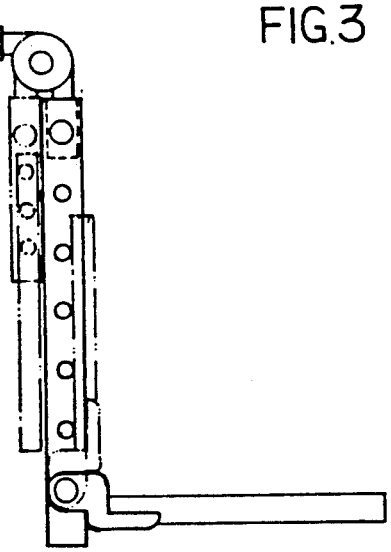

STEP FOR ATTACHMENT TO A WHEEL

BACKGROUND OF THE INVENTION

The present invention generally relates to a step or platform, and more particularly to a portable step or platform adapted to be attached to a wheel of a vehicle to support a person.

Large vehicles such as trucks, tractors, semi-tractors, four-wheel drive vehicles, etc. tend to be extremely high off the ground making it difficult to access the engine compartment for an engine maintenance or repair or the roof or loading platform for loading and unloading operations when necessary. An average size person must either stand on the vehicle bumper, a ladder, bench, box or similar object to in order to reach the engine compartment, roof or loading platform. Supports such as a ladder, box or bench are often not available and tend to be awkward and unreliable for support.

Attempts have been made to provide a vehicle-attached support platform which overcomes the above problems. For example, U.S. Pat. No. 4,947,961 to Dudley discloses a portable step apparatus for removable connection to the wheel or bumper of a vehicle to provide a stable platform for a person. The step apparatus comprises a support frame assembly securely attached to the exterior surface of the wheel or bumper by an attaching apparatus, a step assembly adjustably attached to the frame assembly so that the user can adjust the step the desired height, stabilizing straps attached to the bottom of the frame assembly and wrapped around the tire, or passed below the bumper and securely attached to the vehicle to prevent the bottom of the frame assembly from moving sideways or from being pushed away from the vehicle.

Although the prior art device includes portable step adapted to be attached to a vehicle wheel, it has not completely solved the problems inherent in portable platform of this type. The present invention is simple and compact in design and universally adaptable for use on a wide variety of shapes and sizes of vehicle wheels.

SUMMARY OF THE INVENTION

A primary object of the present invention is to provide a step or platform attachable to a vehicle wheel for supporting a person.

Another object of the present invention is to provide a step or platform which is portable and easily adjustable for use on a wide variety of vehicles, yet which is also of a sturdy construction and design, thus rendering it safe and reliable in use.

With the above objectives in view, this invention provides a step for attachment to a wheel which comprises a support frame securely attached to the exterior surface of the wheel by an attaching apparatus, a step assembly adjustably attached to the frame assembly so that the user can adjust the step the desired height.

BRIEF DESCRIPTION OF THE DRAWINGS

The above and other objects, features and advantages of the invention will become apparent from a consideration of the following detailed description presented in conjunction with the accompanying drawings, wherein:

FIG. 2 is a diagramatically side elevational view of the first embodiment showing a folding operation of a step assembly thereof;

FIG. 3 is a side elevational view of the first embodiment showing a height adjustment operation;

FIGS. 4A and 4B are enlarged cross-sectional views showing a buckle to be used in the present invention to lock telescopic parts of the present invention;

FIG. 6 is a diagramatically side elevational view of the second embodiment showing collapse and adjustment operations thereof;

DETAILED DESCRIPTION OF THE INVENTION

Figure 1:
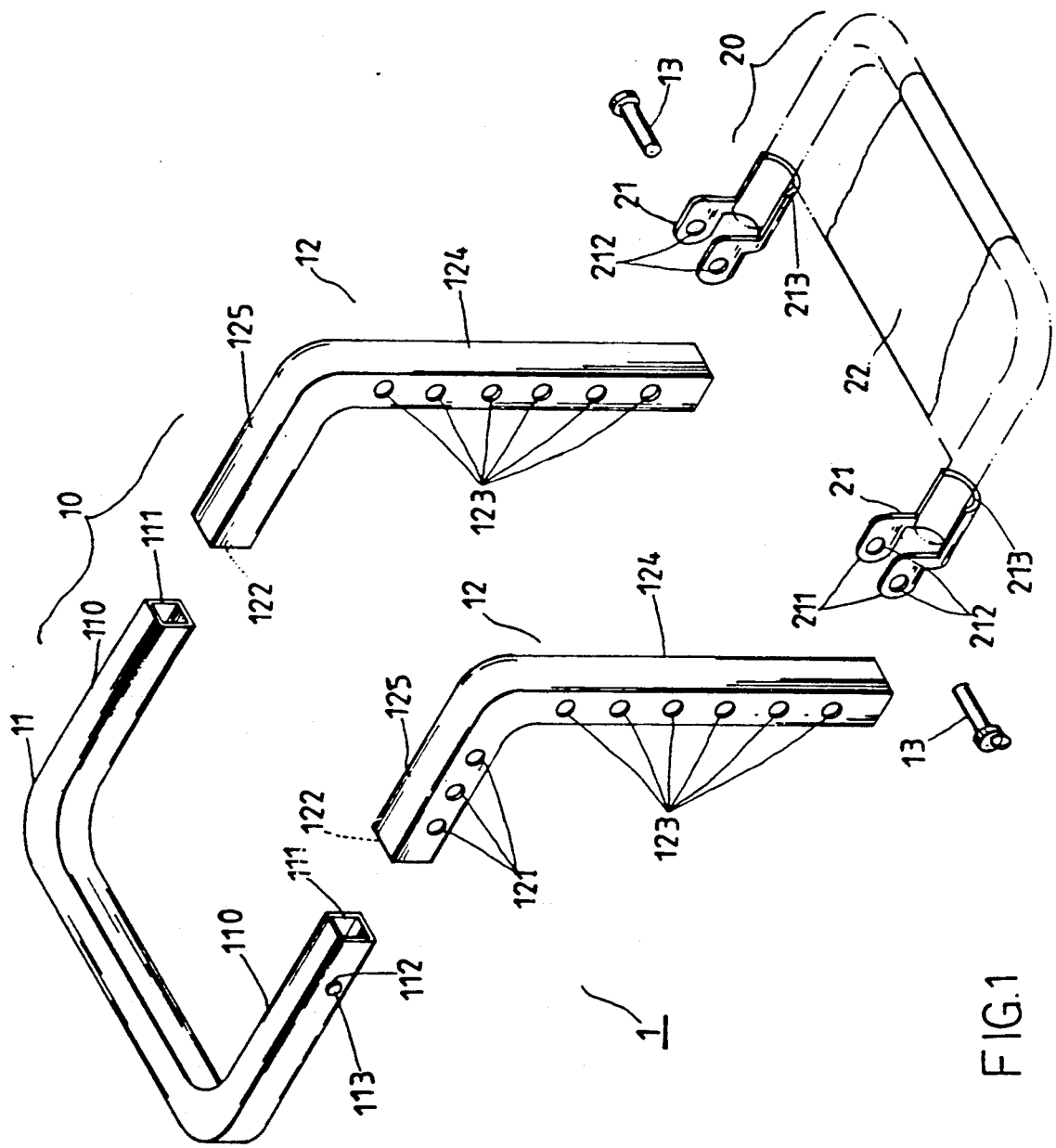
FIG. 1 is a perspective exploded view of a portable step of a preferred embodiment according to the present invention.

Referring now to the drawings, a portable step of the present invention is designated in its entirety by reference numeral 1. As illustrated in FIG. 1, the portable step 1 comprises a planar member 22 and a wheel attachment assembly 10 on the back of the planar member 22 for hooking onto either the front wheel or rear wheel of a vehicle thereby to suspend the step from the vehicle.

The wheel attachment assembly 10 comprises a pair of generally reverse L-shaped members 12 and a generally U-shaped gripping member 11. Each of the reverse L-shaped members 12 is preferably made of tubular steel having a generally rectangular cross section and includes a vertical leg 124 adapted to be hingedly attached to the back of the planar member 22 and a horizontal adjustment portion 125 extending rearwardly from the upper end of the leg 124 to form an opening 122.

The U-shaped gripping member 11 has a pair of attachment bars 110 each of which is formed with an opening 112 through the exterior side surface thereof and dimensioned to slide through the interior of the adjustment portion 125. A plurality of openings 121 spaced at regular intervals along each adjustment portion 125 are provided radially through each adjustment portion 125 so that the distance between the gripping member 11 and the legs 124 may be varied to accommodate different size wheels. A pin (not shown) or buckle 113 would then be used to lock or secure the gripping member 11 in adjusted position with respect to the reverse L-shaped members 12.

Fastener means 21 are provided for removably fastening the planar member 22 to the legs 124. Each of said fastener means 21 comprises a bracket 21 having a base 213 welded to the bottom of the planar member 22 and a pair of spaced-apart plates 211 extending upwardly then rearwardly for receiving one of the legs 124. Said plates 211 of the bracket 21 is formed with a pair of horizontally aligned openings 212 for receiving a pin 13. A plurality of openings 123 spaced at regular intervals along each leg 124 are provided through each leg 124 so that the elevation of the planar member 22 above the ground may be varied according to which opening 123 is lined up with the horizontally aligned openings 212 of the bracket, as best shown in FIG. 3.

The planar member 22 can be swung counterclockwise about the pin 13 to collapse the planar member 22 with the top surface thereof adjacent the legs 124, as best shown in FIG. 2.

When the planar member 22 is thus attached to the legs 124, a load on the planar member 22, such as a person standing thereon, is fully supported by the reverse L-shaped members 12 and the contact between the rear ends of the base 213 of the brackets 21 and the front surfaces of the legs 124.

As shown in FIGS. 4A and 4B, the buckle 113 includes a metal head 1130 shaped to allow it to extend through aligned openings 112, 121 of the attachment bar 110 of the gripping member 11 and adjustment portion 125 of the reverse L-shaped member 12 and a U-bent spring 1131 accommodated in the attachment bar 110 with one end thereof welded to an internal side wall of the attachment bar 110, and the other end attached to the metal head 1130. In operation, the metal head 1130 can be pressed with thumb or a finger to unlock the adjustment portion 125 from the attachment bar 110 of the gripping member 11. The metal head 121 will automatically lock the gripping member 11 in another adjusted position with respect to the reverse L-shaped members 12 by the biased U-bent spring 1131 when the opening 112 is once again lined up with a selected opening 121 in the adjustment portion 125.

Figure 5:
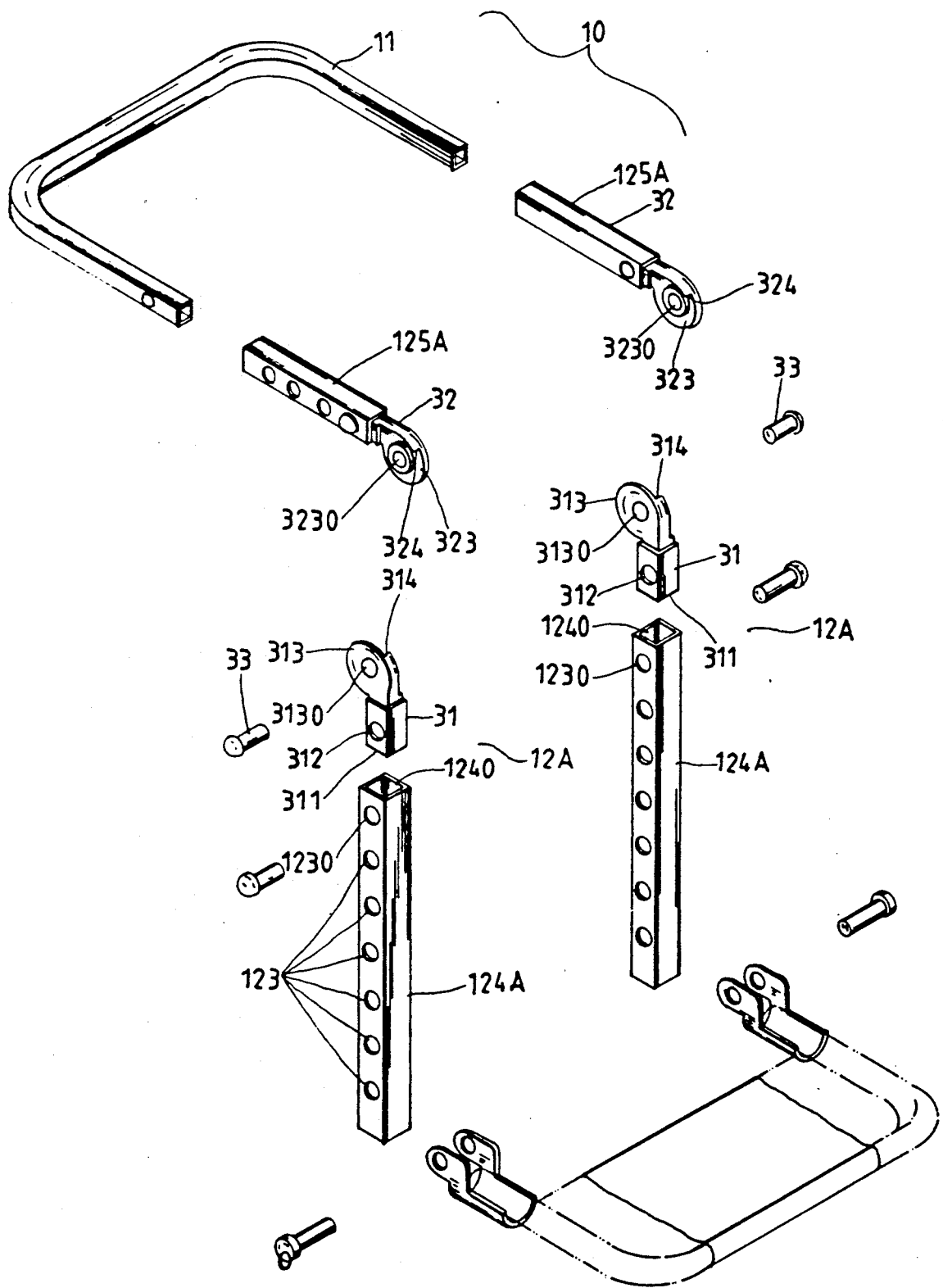
FIG. 5 is an exploded perspective view showing a second embodiment of the present invention.

FIG. 5 illustrates a second embodiment of the invention generally corresponding to the embodiment of FIGS. 1-4, the principle difference being that the reverse L-shaped members, here designated 12A, are respectively formed with pivotal joints 3 so that the wheel attachment assembly 10 is collapsible to minimize the size of the portable step 1 for storage. Each of the reverse L-shaped members 12A hereof comprises a vertical leg 124A preferably made of tubular steel having a generally rectangular cross section to form an open top 1240, an adjustment portion 125A and a pivotal joint 3 inbetween. The pivotal joint 3 includes a first half 31 having a connection end 311 sized to allow it to be slid into the top end opening 1240 of the leg 124A. An opening 312 is formed in the connection end 311 of the first half 31 corresponding to an opening 1230 in the exterior side surface of the leg 124A may be pinned in the same manner as indicated above with respect to the other pinned connections of the invention. If desired, however, first half 31 of the pivotal joint 3 may alternatively be welded or otherwise permanently attached to the top end of the leg 124A.

The other end opposite to the connection end 311 of the first half 31 is integrally formed with a disc member 313 adapted to couple with a disc member 323 of a second half 32 integrally attached to the adjustment portion 125A. The first and second halves 31, 32 are respectively formed with axial holes 3130, 3230 to receive a rivet 33 so as to pivotally secure the first and second halves 31, 32 of the joint 3. The first and second halves 31, 32 of the joint 3 are respectively provided with stop surfaces 314, 324 which are arranged to abut against each other when the adjustment portion 125A is swung to extend at 90 degrees apart from the leg 124A.

Figure 7:
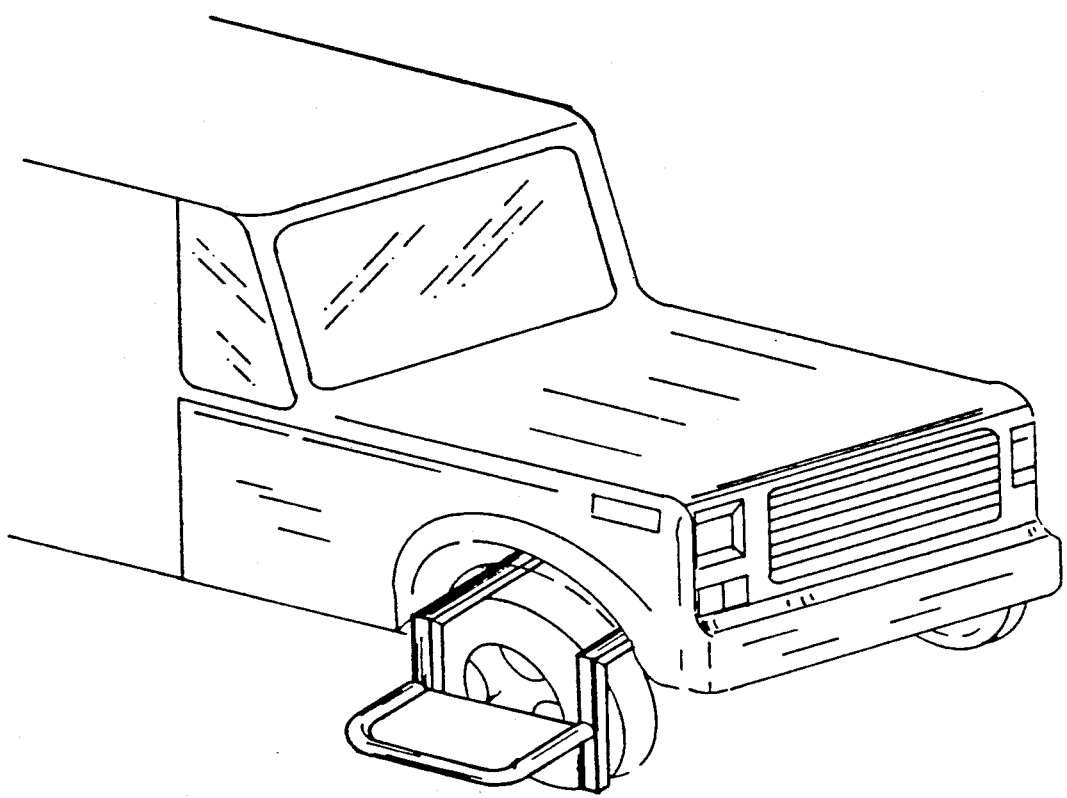
FIG. 7 is a perspective view of the portable step attached to a vehicle wheel.
Figure 8:
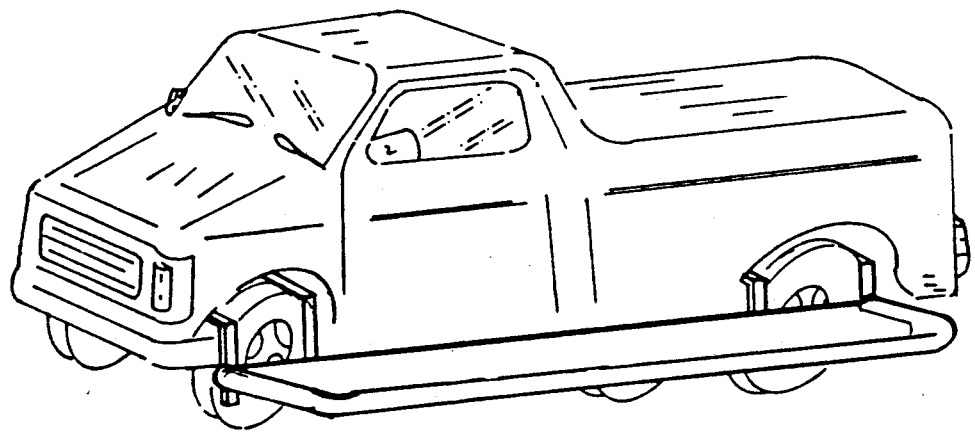
FIG. 8 is a perspective view of a further embodiment of the present invention showing two wheel attachment assemblies attached to a front wheel and rear wheel of a light truck to suspend a long platform at an elevation above the ground.

When the adjustment portions 125A are thus attached to the legs 124A, the gripping member 11, adjustably secured to the adjustment portions 125A as described above, is collapsible to minimize the size of the portable step 1 for storage when not in use, as best shown in FIG. 6. The portable step 1 of the invention can thus be attached either to a front wheel or a rear wheel to suspend the planar member 22 in a position wherein it is generally horizontal and at an elevation above the ground where a person standing on the planar member has convenient access to the engine compartment or upper portion of the vehicle, as best shown in FIG. 7. It is to be noted that two portable steps of the invention can be respectively attached to the front and rear wheels to suspend a long planar member for a better support to one or more persons working in the vehicle, as best shown in FIG. 8.

I claim:

1. A portable step apparatus for removable connection to a vehicle wheel for providing a stable platform for supporting a person while working on said vehicle, the apparatus comprising:

a support frame assembly means having a spaced-apart side supporting frame members held in a spaced-apart relationship, each of the side supporting frame members comprising a leg and an adjustment portion extending from a top end of the leg over the top of the vehicle wheel, both of the leg and adjustment portion being formed with a plurality of openings at regular intervals;

an internal passageway extending from one end of the adjustment portion towards the top end of the leg;

a U-shaped gripping member having a pair of tubular attachment bars bent from two ends of an elongated member, each of the tubular attachment bars being formed with a opening and dimensioned to slide along the respective internal passageway of the adjustment portion;

lock means accommodated in the tubular attachment bars to secure one of the tubular attachment bars to one of the adjustment portions at a plurality of predetermined locations to adjust a distance between the elongated member of the U-shaped gripping member and the legs of the side supporting frame members for an attachment to the vehicle wheel;

a planar member; and means for adjustably and hingedly attaching the planar members to the legs of the side supporting frame members comprising a pair of bracket members each having a base rigidly attached to a bottom of the planar member and two spaced-apart plates extending upwardly then rearwardly from the planar member and having horizontally aligned openings adapted to correspond to one of a plurality of the openings of the legs for releasably connecting the planar member to the legs with pins at a plurality of predetermined locations so that the planar member is collapsible when not in use.

2. A portable step apparatus according to claim 1 wherein the lock means includes a buckle with an outer portion thereof extruding from the opening of one of the tubular attachment bars and a U-bent spring with a first end thereof attached to an internal side wall of the tubular attachment bar and a second end attached to an inner end of the buckle so as to secure the tubular attachment bar to a corresponding adjustment portion at a plurality of predetermined locations with the buckle which is biased by the U-bent spring to extend through aligned openings of the tubular attachment bar and adjustment portion.

3. A portable step apparatus according to claim 1 wherein each of the side supporting frame members is formed with a joint pivoted with a rivet between the leg and adjustment portion thereof so that the U-shaped gripping member attached the adjustment portions of the side supporting frame members is collapsible when not in use.

* * * * *